(12) United States Patent
Palenius et al.

(10) Patent No.: US 7,626,956 B2
(45) Date of Patent: Dec. 1, 2009

(54) METHOD AND APPARATUS FOR WIRELESS INTERSYSTEM HANDOVER

(75) Inventors: Torgny Palenius, Barsebäck (SE);
Johan Hokfelt, Lund (SE); Christer Östberg, Staffanstorp (SE); Jan Wichert, Malmo (SE); Mikael Nilsson, Lund (SE); Richard Ewald, Lund (SE); Patrik Olofsson, Höllviken (SE); Hákan Palm, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 202 days.

(21) Appl. No.: 10/551,892

(22) PCT Filed: Apr. 3, 2004

(86) PCT No.: PCT/EP2004/003564

§ 371 (c)(1),
(2), (4) Date: Jan. 19, 2006

(87) PCT Pub. No.: WO2004/091241

PCT Pub. Date: Oct. 21, 2004

(65) Prior Publication Data

US 2007/0110022 A1    May 17, 2007

Related U.S. Application Data

(60) Provisional application No. 60/462,005, filed on Apr. 11, 2003.

(30) Foreign Application Priority Data

Apr. 11, 2003    (EP)    ................... 03008439

(51) Int. Cl.
*H04B 7/00*    (2006.01)

(52) U.S. Cl. .................. 370/310; 455/434; 455/435.2; 455/436

(58) Field of Classification Search ................ 455/413, 455/434, 435.2, 436
See application file for complete search history.

(56) References Cited

U.S. PATENT DOCUMENTS 5,943,333 A    8/1999    Whinnett et al.

(Continued)

FOREIGN PATENT DOCUMENTS

EP    1 292 051 A1    3/2003

(Continued)

OTHER PUBLICATIONS

PCT International Search Report, dated Jul. 1, 2004, in connection with International Application No. PCT/EP2004/003564.

(Continued)

*Primary Examiner*—Lester Kincaid
*Assistant Examiner*—Charles Shedrick
(74) *Attorney, Agent, or Firm*—Potomac Patent Group PLLC

(57) ABSTRACT

A method and apparatus for measurement event synchronization of a portable radio communication apparatus providing multiple radio access technologies, wherein an idle gap is identified between transceiver activities of a first radio access technology device, and an execute signal is sent to a second radio access technology device for initiating inter radio access technology measurements of the second radio access technology device, to be performed during the gap.

13 Claims, 6 Drawing Sheets

U.S. PATENT DOCUMENTS

| | | | |
|---|---|---|---|
| 7,230,932 B2 * | 6/2007 | Numminen, Jussi | 370/311 |
| 2001/0028674 A1 | 10/2001 | Edlis et al. | |
| 2003/0003951 A1 | 1/2003 | Leprieur et al. | |

FOREIGN PATENT DOCUMENTS

| | | |
|---|---|---|
| WO | WO 02/37868 A2 | 5/2002 |
| WO | WO 02/39758 A2 | 5/2002 |

OTHER PUBLICATIONS

PCT International Preliminary Report on Patentability, dated Oct. 27, 2005, in connection with International Application No. PCT/EP2004/003564.

* cited by examiner

METHOD AND APPARATUS FOR WIRELESS INTERSYSTEM HANDOVER

CROSS REFERENCE TO RELATED APPLICATIONS

This application claims the benefit of U.S. provisional application Ser. No. 60/462,005, filed Apr. 11, 2003, which is hereby incorporated herein by reference in its entirety. This application further claims priority under 35 U.S.C. §119 to European Patent Application No. 03008439.6, field on Apr. 11, 2003, which is hereby incorporated herein by reference in its entirety.

FIELD OF THE INVENTION

The present invention relates to a method and apparatus for measurement event synchronisation of a portable radio communication apparatus providing multiple radio access technologies, and more particularly to a method and apparatus for measurement event synchronisation of a portable radio communication apparatus, comprising multiple and operatively interconnected radio access technology devices.

DESCRIPTION OF THE PRIOR ART

A multiple RAT (Radio Access Technology) terminal is a kind of communication apparatus recently introduced, that comprises two or more radio access technology devices based on different access technologies. A more specific example of a multiple RAT terminal is a dual RAT terminal, that includes two radio access technology devices based on for example the GSM (Global System for Mobile Communication) and the WCDMA (Wide band Code Division Multiple Access) technologies. This new kind of communication apparatuses provide great flexibility for end users, to have only one terminal for usage in different countries and regions providing digital cellular system infrastructures based on different radio access technologies.

An additional dimension and further advantage for multiple RAT terminal users are achieved in single regions providing multiple digital cellular system infrastructures based on different radio access technologies. This multiple capability holds out the further advantage, that the most suitable radio access technology of the multiple RAT terminal can be selected for communication in each situation.

For mobility functionality, i.e the user of the terminal crosses cell boarders, a multiple or dual RAT terminal needs to perform base station signal level and identification measurements on both systems, for example WCDMA and GSM systems. This is performed by inter-system measurements that consist at least partly of finding and determining the identity of base stations for the respective system. When connected to one system, the terminal has to support measurements on another system. One way of implementing a dual RAT terminal is to have two seperate radio sets, one for each RAT device, that operate independent of each other. This solution has, however, drawbacks with respect to size, RF (Radio Frequency) performance, and interference between radio devices that are arranged or located close to each other.

It is however desirable to utilise parts of the radio resources, i.e components common for both technologies, at least for reduced power consumption and miniaturisation purposes. In this kind of dual RAT system the two different radio access technology units will work together in a quasi-parallel manner, wherein one of the units is active and the other one is non-active or passive. Measurements on the passive system cannot be carried out while the terminal is receiving/transmitting on the connected or active system. These measurements can be performed either when there are gaps in the reception/transmission of the connected system or in parallel with the reception of the connected system when only downlink gaps are required.

The inter-RAT measurements consist in part of finding and determining the identity of base stations. Each WCDMA base station can be identified in any measurement gap, provided that it has a minimum length, but independent on the specific placement of the gap in time. In contrast, identification of a specific GSM base station can only take place during particular time slots, which make the particular timing of the measurement gap important. This fact implies that identification of GSM base stations requires some degree of planning, whereas WCDMA base station identification can be performed without knowing the exact timing of the measurement gap.

With or without common radio resources, there is a particular problem associated with a situation, where a dual RAT terminal is camping on a scheme belonging to a GSM network and where the terminal does not support WCDMA measurements to be performed while the GSM RAT device is either receiving or transmitting.

Moreover, it is difficult to schedule in advance how the GSM idle gaps should be distributed between the GSM RAT device and WCDMA RAT device, since the need for GSM measurement gaps is not predictable. Hence, it is not possible to inform the WCDMA RAT device in advance of when the WCDMA measurement gaps will occur.

From a complexity point of view, it is preferred not to plan the measurements of both systems in one scheme, i.e planning activity in WCDMA time format and GSM activity in GSM timeformat each with a separate low layer software and hardware support. The only common planning needed is to ensure that the GSM RAT device and the WCDMA RAT device do not use the same GSM idle gaps for measurements. The cell measurements of the two access technologies are otherwise not dependent on each other. Moreover, the WCDMA RAT device does not require access to several succeeding GSM idle gaps. Therefore, it is preferred that the WCDMA RAT device and the GSM RAT device plan their own activities independently.

SUMMARY OF THE INVENTION

It is an object of the present invention to provide a method for measurement event synchronisation of terminals with multiple radio access technologies.

This object is achieved by a method for measurement event synchronisation of a portable radio communication apparatus providing multiple radio access technologies, characterized by the steps of identifying an idle gap between transceiver activities of a first radio access technology device, and sending an execute signal to a second radio access technology device for initiating inter-radio access technology measurements of said second radio access technology device to be performed during said gap.

A more specific object of the invention is to provide an apparatus for working said method.

This specific object of the invention is achieved by a portable radio communication apparatus providing multiple radio access technologies, comprising a first radio access technology device and a second radio access technology device, wherein the first and second radio access technology devices are operatively interconnected. The portable radio communication apparatus further comprises a controller adapted to identify an idle gap between transceiver activities of the first radio access technology device, and send an execute signal to the second radio access technology device for initiating inter-radio access technology measurements of the second radio access technology device to be performed during the gap.

An advantage of the method and apparatus according to the invention is that a low complexity solution is provided with low real time requirements, for the problem of event synchronisation of GSM and WCDMA radio access technologies. Moreover, the method allows an implementation where both RAT devices plan their activities independently of each other. Thereby, the development of platforms for GSM and WCDMA can be performed independently of each other. Another advantage is that the method does not require synchronisation of the clocks in the GSM and the WCDMA RAT devices.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF THE INVENTION

Figure 1A:
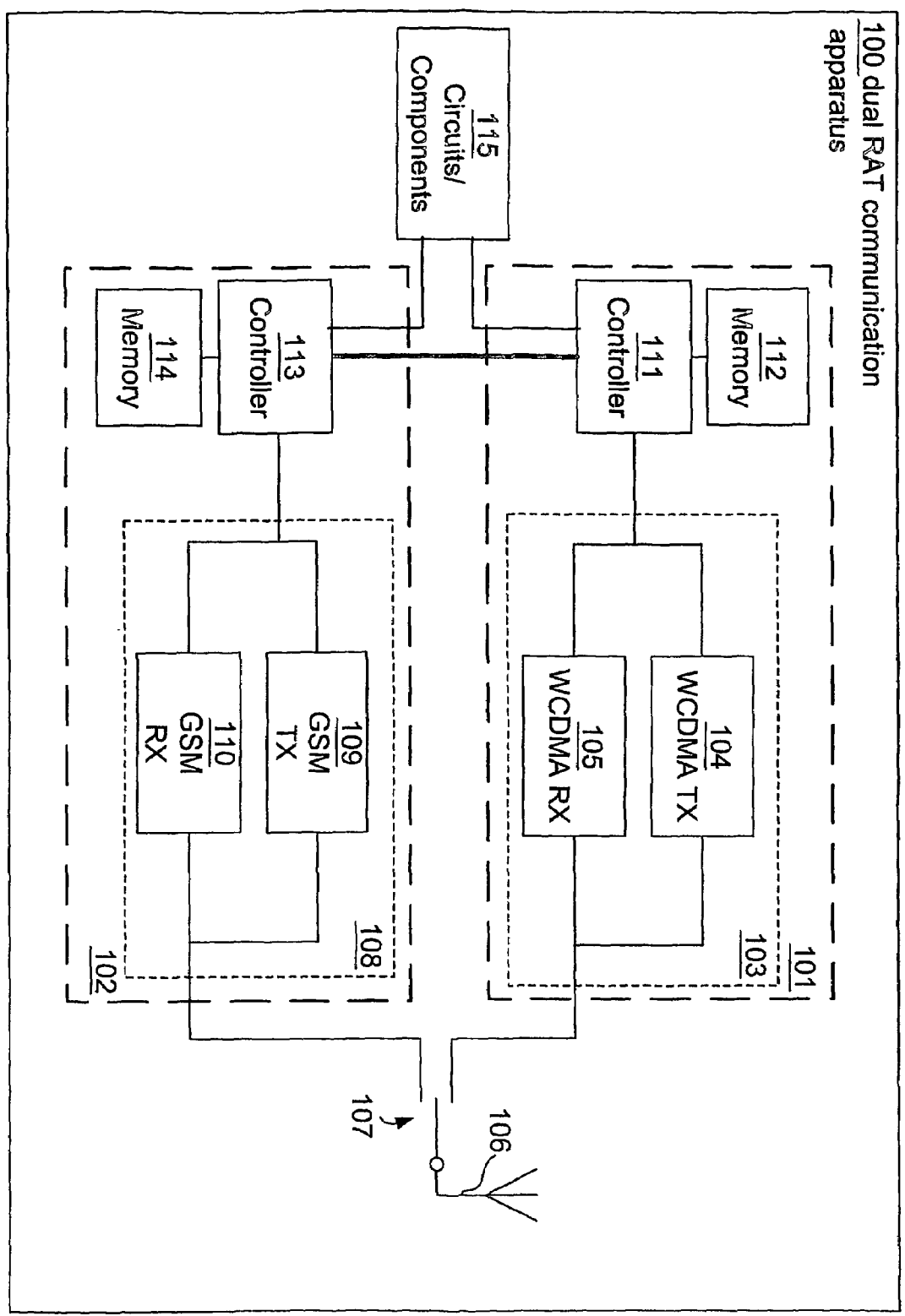
FIG. 1A is a schematic block diagram of a first embodiment of a dual-radio access technology terminal according to the invention.

An embodiment of a multiple radio access technology (RAT) terminal utilising common radio resources for size and RF (radio frequency) performance reasons and having means for measurement event synchronisation according to the invention is shown in FIG 1A. In this embodiment, the terminal has two different radio access technology devices and is therefore referred to as a dual RAT terminal or communication apparatus 100. The term terminal or communication apparatus includes portable radio communication equipment. The term portable radio communication equipment includes all equipment such as mobile telephones, pagers, communicators, i.e electronic organizers, smartphones or the like.

The communication apparatus 100 includes but is not limited to a first radio access technology device 101 based on WCDMA (Wideband Code Division Multiple Access) and a second radio access technology device 102 based on GSM (Global System for Mobile Communication). The first radio access technology device 101 has a WCDMA radio transmitter/receiver or transceiver 103, which is adapted to establish and maintain WCDMA connections with other communication equipment via a WCDMA base station, described later. The transceiver 103 has a transmitter 104 and a receiver 105, connected to an antenna 106 via an antenna switch 107. The second radio access technology device 102 has a GSM radio transmitter/receiver or transceiver 108, which is adapted to establish and maintain GSM connections with other communication equipment via a GSM base station, described later. The transceiver 108 has a transmitter 109 and a receiver 110, connected to the common antenna 106 via said antenna switch 107.

The WCDMA transceiver 103 is connected to a controller 111. The controller 111 may be implemented in several different ways, such as in the form of a programmable microprocessor (CPU), an Application-Specific Integrated Circuit (ASIC), or any other electronic logic device that fulfils the functional requirements set out below. Portions of the controller 111 may also be implemented in the form of software program instructions, which are stored in an electronic memory 112 and may be read and executed by the controller 111. The memory 112 is coupled to the controller 111 and may be implemented e.g. as a RAM memory, ROM memory, EEPROM memory, flash memory, etc.

Similarly, the GSM transceiver 108 is connected to a controller 113. This controller 113 can also be implemented in several different ways, such as in the form of a programmable microprocessor (CPU), an Application-Specific Integrated Circuit (ASIC), or any other electronic logic device that fulfils the functional requirements set out below. Portions of the controller 113 may also be implemented in the form of software program instructions, which are stored in an electronic memory 114 and may be read and executed by the controller 113. The memory 114 is coupled to the controller 113 and may be implemented e.g. as a RAM memory, ROM memory, EEPROM memory, flash memory, etc.

In this embodiment of the invention the communications apparatus 100 is a mobile telephone that can be used for but is not limited to conventional mobile communications. Additionally it can be used for wideband digital radio communications of advanced Mobile Internet services, multimedia, video and/or other capacity-demanding applications with the WCDMA and GSM mobile telecommunications networks, which preferably operate at about 2 GHz and 900, 1800 and/or 1900 MHz, respectively.

Figure 1B:
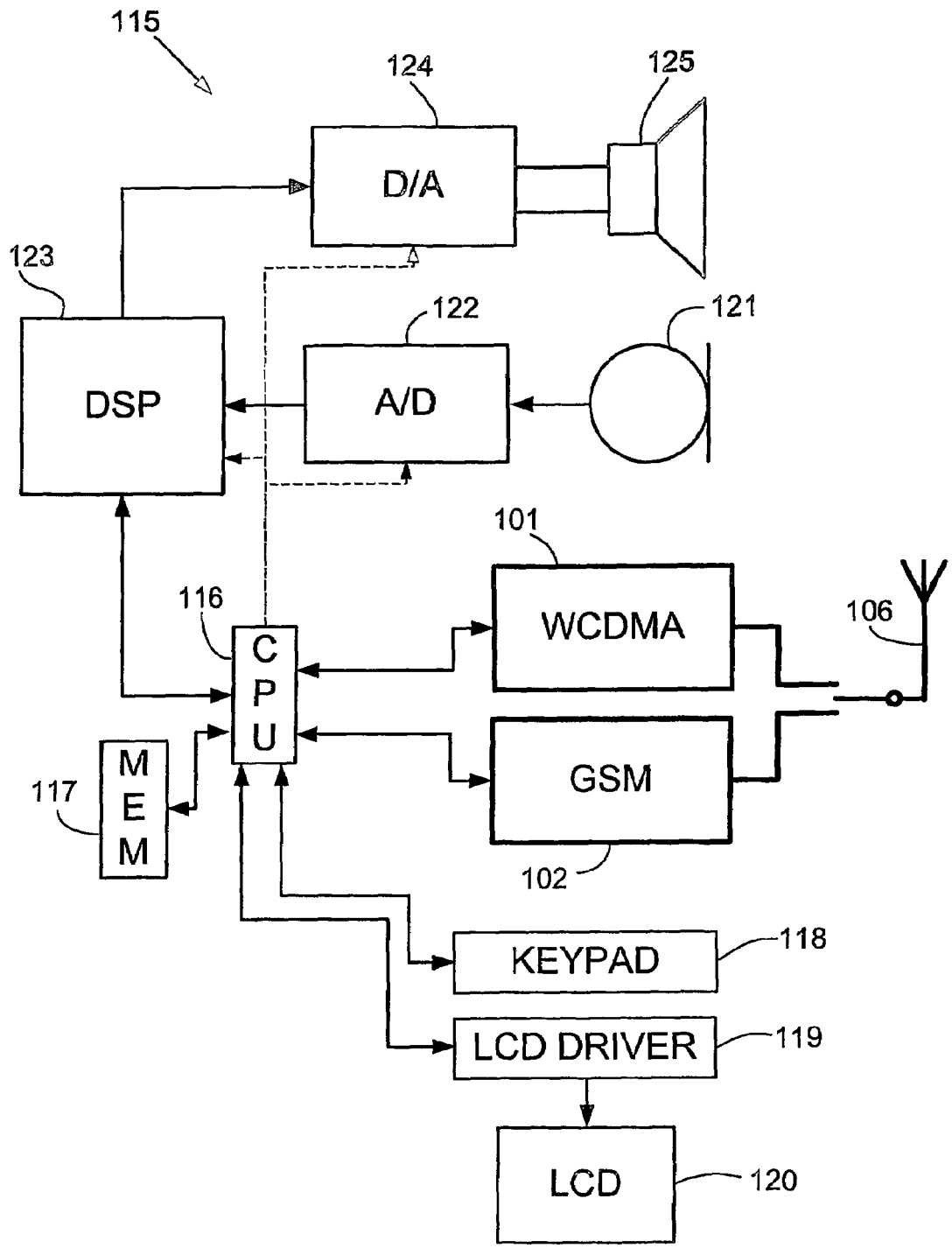
FIG. 1B is a schematic block diagram of the dual-radio access technology terminal in FIG. 1A with circuits/components in further detail.

The dual radio access technology communication apparatus 100 comprises additional circuits and/or components 115 to make the apparatus operate properly. With reference to FIG. 1B, these circuits and/or components 115 include but are not limited to an additional controller or central processing unit (CPU) 116 provided for interpretation and execution of program instructions for communication with the first and second radio access technology devices 101, 102 and for controlling the operations of other components and blocks in the apparatus, such as a data and program memory 117, a keypad 118, an LCD driver 119 for driving an LCD display 120, a microphone 121, which is adapted: to receive sound waves from for example a human voice of a user of the phone for conversion into an analog signal. The microphone is connected to a first analog-to-digital (A/D) converter 122, which converts the analog signal from the microphone to a digital signal before input to a digital signal processor 123 (DSP). The DSP 123 processes the digital signal from the A/D converter 122, and data from the keypad 118 and the display are adapted for further transmission via the first radio access technology device 101 based on WCDMA or the second radio access technology device 102 based on GSM. Signals received by the first and second radio access technology devices 101 and 108 are transferred to a digital-to-analog (D/A) converter 124, which converts the digital signal to an analog signal for reproduction by a loudspeaker 125 connected to the D/A converter 124. Other data such as picture, text, or video data, etc that are received are forwarded to the display or other accessories of the apparatus 100.

Figure 2:
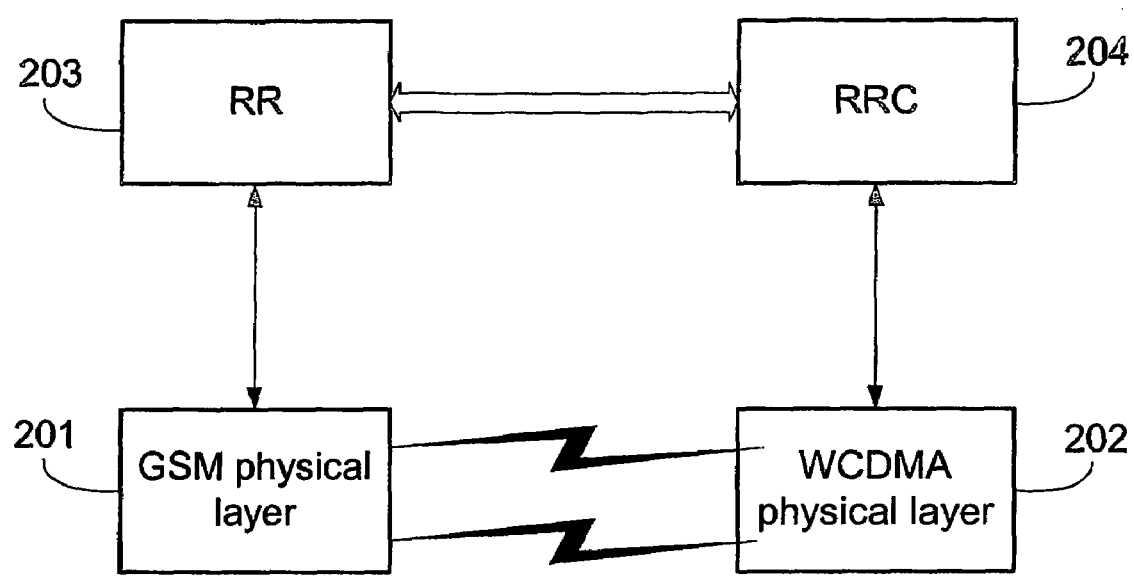
FIG. 2 is a schematic view of the different levels of communication for measurement event synchronisation between first and second radio access technology devices of the dual-radio access terminal in FIG. 1A.

FIG. 2 is an illustrative view of the different layers of hardware and software of the apparatus 100 involved in the method of measurement event synchronisation, described later, between the GSM RAT device 102 and the WCDMA RAT device 101. The two blocks to the left in FIG. 2 represent the GSM RAT device 102 and the two blocks to the right in FIG. 2 represent the WCDMA RAT device 101. A GSM physical layer block 201 illustrates the physical or hardware layer for communication and access of the physical medium between the GSM RAT device 102 and the WCDMA RAT device 101. A corresponding physical layer block of the WCDMA RAT device is the WCDMA physical layer block 202. On the next level there is a management physical layer or radio resource block (RR) 203, which is responsible for establishing, maintaining and terminating connections with the WCDMA RAT device 101 and communicates with the corresponding radio resource controlled block (RRC) 204 of the WCDMA RAT device.

Figure 3:
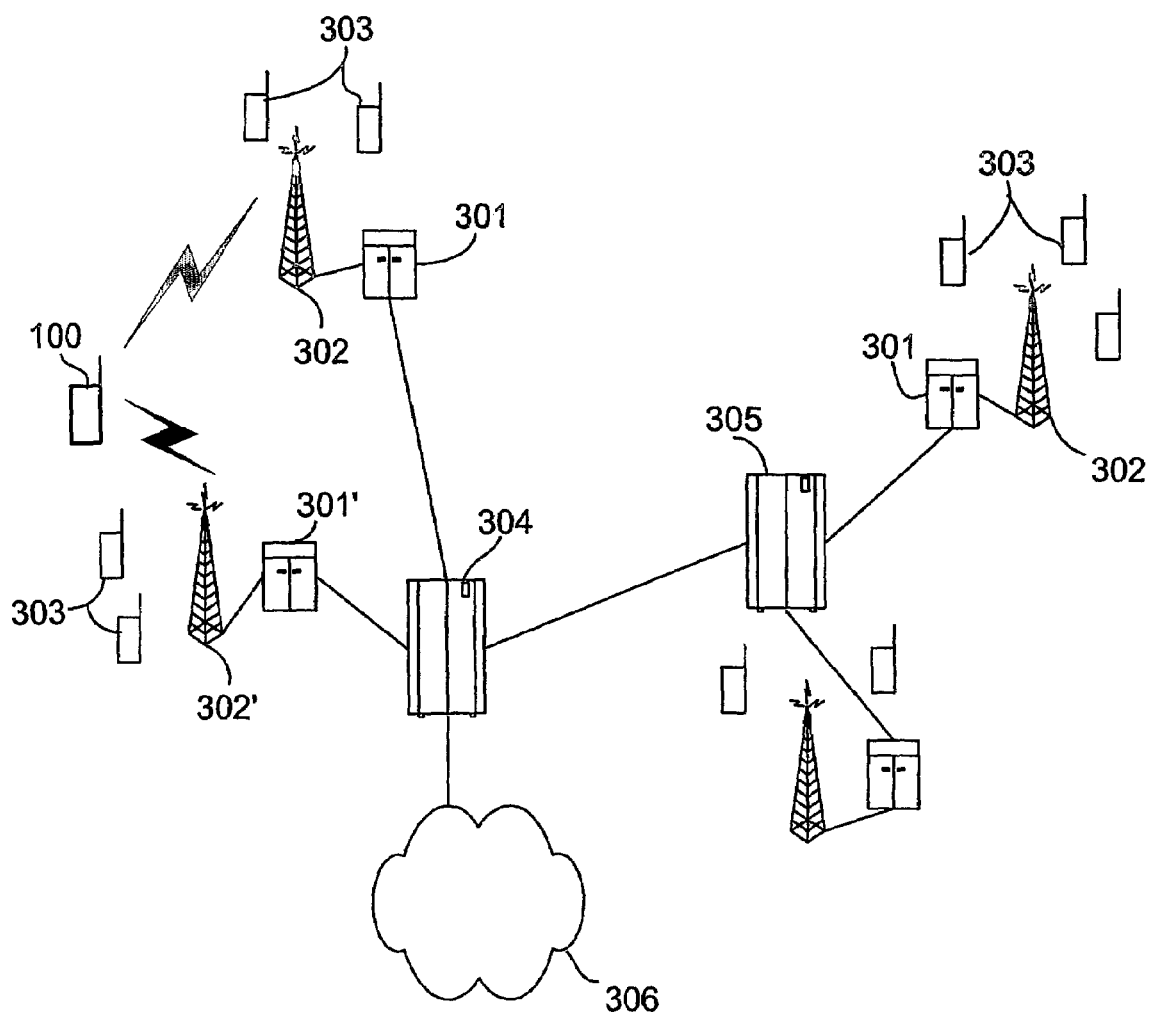
FIG. 3 is a schematic view of a cellular mobile telephone network.

FIG. 3 shows an embodiment of a part of a dual RAT system including a cellular mobile telephone network for cellular telephone service. Cellular telephone service involves the subdivision of a service area into a number of smaller cells. Each cell requires a base station (BS) 301, 301'—a GSM base station or WCDMA base station—and an antenna 302, 302'. One BS can support several cells. A GSM base station and a WCDMA base station may be located separately or at the same location. In this embodiment of the network the base station 301 is a GSM base station and the base station 301' is a WCDMA base station. The base stations 301, 301' perform the switching function as well as the tracking of mobile telephone users. A gateway mobile services switching center (GMSC) 304 or only mobile services switching center (MSC) 305 provides the network with specific data about individual mobile phones 303 or dual RAT terminals 100 and operates as an interface to a public switched network (PSTN) 306.

In this dual RAT system, the GSM radio access technology device 102 and the WCDMA radio access technology device 101 work together in a quasi parallel manner, wherein the first RAT device will be active and the second RAT device will be non-active (or passive). In this embodiment of the invention, the GSM RAT device is the active and the WCDMA RAT device operates as a slave system to the GSM RAT device. The non-active radio access device, i.e. the WCDMA RAT device 101 in this embodiment, shall monitor its neighbouring base stations. In this example embodiment the dual RAT terminal 100 only has one close neighbouring WCDMA base station 301'. Although only one neighbouring base station is present in this embodiment, this is for illustration purposes only. In other alternative embodiments of the cellular communication system in FIG. 3 a number of neighbouring base stations, both GSM and WCDMA base stations, can be included to be monitored by the dual RAT terminal 100 within the scope of the invention. When monitoring the neighbouring base station, the non-active RAT device 101 will get time resources from the active RAT device 102 to perform inter-RAT measurements. The operation of the method for measurement event synchronisation of the dual RAT terminal according to the invention depends on the current state of the active GSM RAT device 102. The GSM RAT device can operate in a dedicated/packet transfer state, called a dedicated mode, or in idle/packet idle state, called an idle mode. The dual RAT terminal 100 is also adapted to handle exceptions in the synchronisation method in paging and RACH situations.

When the GSM RAT device 102 is in the idle state, the WCDMA RAT device 101 will get several complete WCDMA frames within which it can perform its synchronisation and measurements. This case does however not require any additional features than provided by normal WCDMA operation.

However, when the GSM RAT device is in dedicated mode, it will allocate a number of idle frames for WCDMA operations.

Figure 4A:
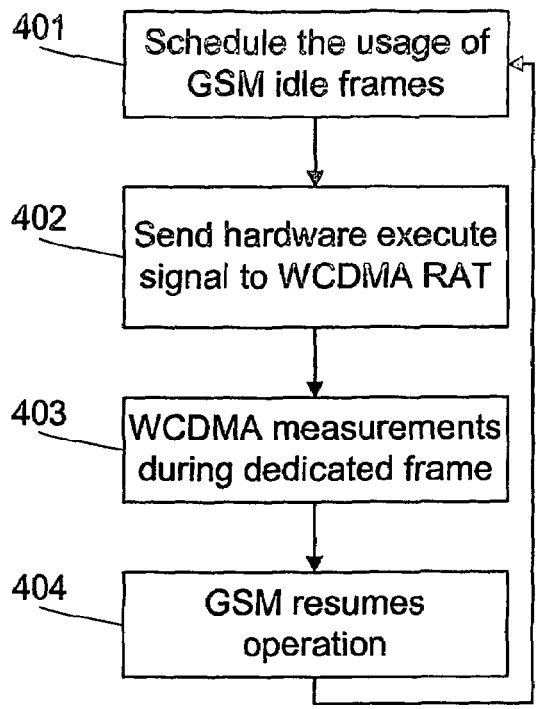
FIG. 4A and FIG. 4B illustrate flowcharts of two alternative embodiments of the method according to the invention.

A first embodiment of the method according to the invention is illustrated by the flowchart in FIG. 4. In a first step 401, the RR 203 plans the schedule for the periods when common radio resources can be used by the passive WCDMA RAT device 101. In dedicated mode, the terminal 100 can measure during so-called idle frames that occur once every 51 multiframe (120 milliseconds) and every 26 multiframe for TCH/F and TCH/H. For TCH/H and packet dedicated full rate and halfrate there might be more than 1 idle frame per 26 resp 52 multiframe and for the various SDCCH subchannels the idle frames are based on a 51 multiframe. These idle frames are, however, used for both GSM measurements and WCDMA inter-RAT measurements. Thus, the available idle frames must be distributed and scheduled between the WCDMA RAT device 101 and the GSM RAT device 102. It is, however, difficult to schedule the usage of GSM idle frames for GSM internal measurements in advance, i.e. a comparably long time ahead. Hence, it is difficult to schedule which idle frames that are available for the WCDMA RAT device to perform measurements.

The RR 203 plans the schedule by identifying an idle frame or gap between transceiver activities that can be used by the WCDMA RAT device 101 for measurements. The next step after identification of a suitable idle gap, a hardware execute signal is sent by the GSM physical layer 201 to the WCDMA physical layer 202, either at the beginning of said gap or at a specified period before said gap, in step 402. In particular cases, the length of the gap is required by the WCDMA RAT device 101. In these cases, the execute signal includes information about the length of the measurement gap. The WCDMA RAT device 101 and its controller 111 takes over the common radio resources, i.e at least the switch 107 and the antenna 106, during the gap and performs its measurements on the neighbouring base stations, the base station 301' in this example, in step 403.

Provided that the gap has a minimum required length, any WCDMA base station can be identified in any measurement gap, independent of the specific placement of the gap in time. Since the WCDMA system is independent of the timings of the available measurement gaps, the WCDMA RAT device 101 can decide which base station, i.e. cell, to measure on during an upcoming gap in advance, and carry out the measurement with very short delay at reception of the execute signal from the GSM RAT device 102.

When the gap is over, the GSM RAT device 102 and its controller 113 resumes its normal operation in step 404, preferably without notification from the WCDMA RAT device 101.

Both the WCDMA transceiver 103 and the GSM transceiver 108 have radio frequency synthesisers that need to be running and stable when the respective technology is either receiving or transmitting, i.e. also during measurement operations. The start-up characteristics of the synthesisers have influence on the timing to an extent depending on the respective start-up time for the synthesisers. Further, the WCDMA receiver 105 needs to tune in every time the WCDMA RAT device 101 is to perform measurements. This tune-in-time has the same influence on the available measurement time as the WCDMA synthesiser start-up time. Due to this start-up time and tune-in-time, the WCDMA RAT device 101 may need to be prepared before the actual execute signal is received and to get enough time of the total length of the gap to perform the measurements.

Figure 4B:
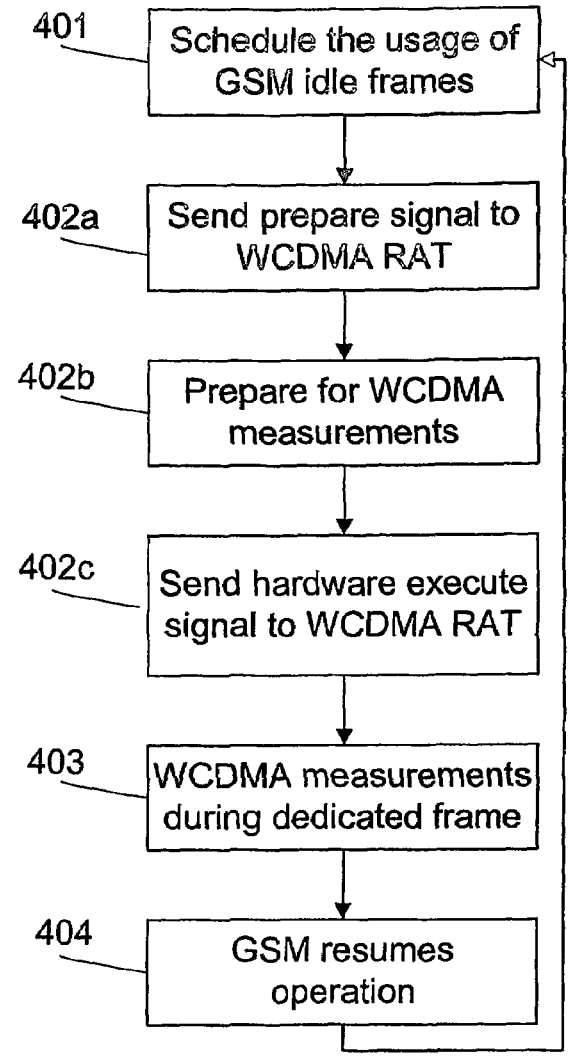

An alternative embodiment of the method of the invention, including the step of sending a "prepare" signal to the passive WCDMA RAT device 101, is illustrated by an extended flowchart in FIG. 4B. The GSM RAT device 102 plans the schedule in step 401 and sends a prepare signal in step 402a to wake up the passive WCDMA RAT device 101. In this case, the prepare signal also includes the information of the length of the upcoming gap. In a next step 402b, the WCDMA RAT device 101 starts up and leaves an occasional low power consuming state to perform necessary preparations for receiving an execute signal sent from the GSM RAT device 102 within a short delay in step 402c. The measurement is then performed by the WCDMA RAT device 101 in step 403 and the GSM RAT device 102 resumes its operation after the measurement in step 404.

When the GSM RAT device 102 is in one of the exception states, the occasions for the non-active WCDMA RAT device 101 are so short that there is no need to interrupt an ongoing occasion. This applies, however, only to neighbouring cell measurements, but not to measurements needed for a PLMN search. Hence, the handling of exceptions is performed by normal scheduling of the frame based synchronisation interrupts. In idle/packet idle state, the GSM RAT device 102 listens to paging, i.e. base stations call their individual terminals in their respective cells, measure the receiver level, identify new neighbouring base stations and reconfirm already identified neighbours. The periods between these activities constitute the source for the schedule.

Although embodiments of the method and apparatus of the invention has been illustrated in the accompanying drawings and described in the foregoing detailed description, the disclosure is illustrative only and changes, modifications and substitutions may be made without departing from the scope of the invention as set forth and defined by the following claims.

In an alternative embodiment of the invention the WCDMA RAT device is active and the GSM RAT device is passive. However, the gaps have to be long enough for GSM measurement planning. This is possible when the WCDMA is in idle mode. In this case the measurement gaps will be of different duration depending on the DRX cycle giving GSM enough time for its planning.

In an alternative embodiment of the dual radio access technology communication apparatus 100 the additional controller or central processing unit (CPU) 116 is adapted to control not only the "other components" 117-125 but also the first and second radio access technology devices 101, 102. Hence, no additional controllers 111 and 113 are required in this alternative embodiment.

Figure 1C:
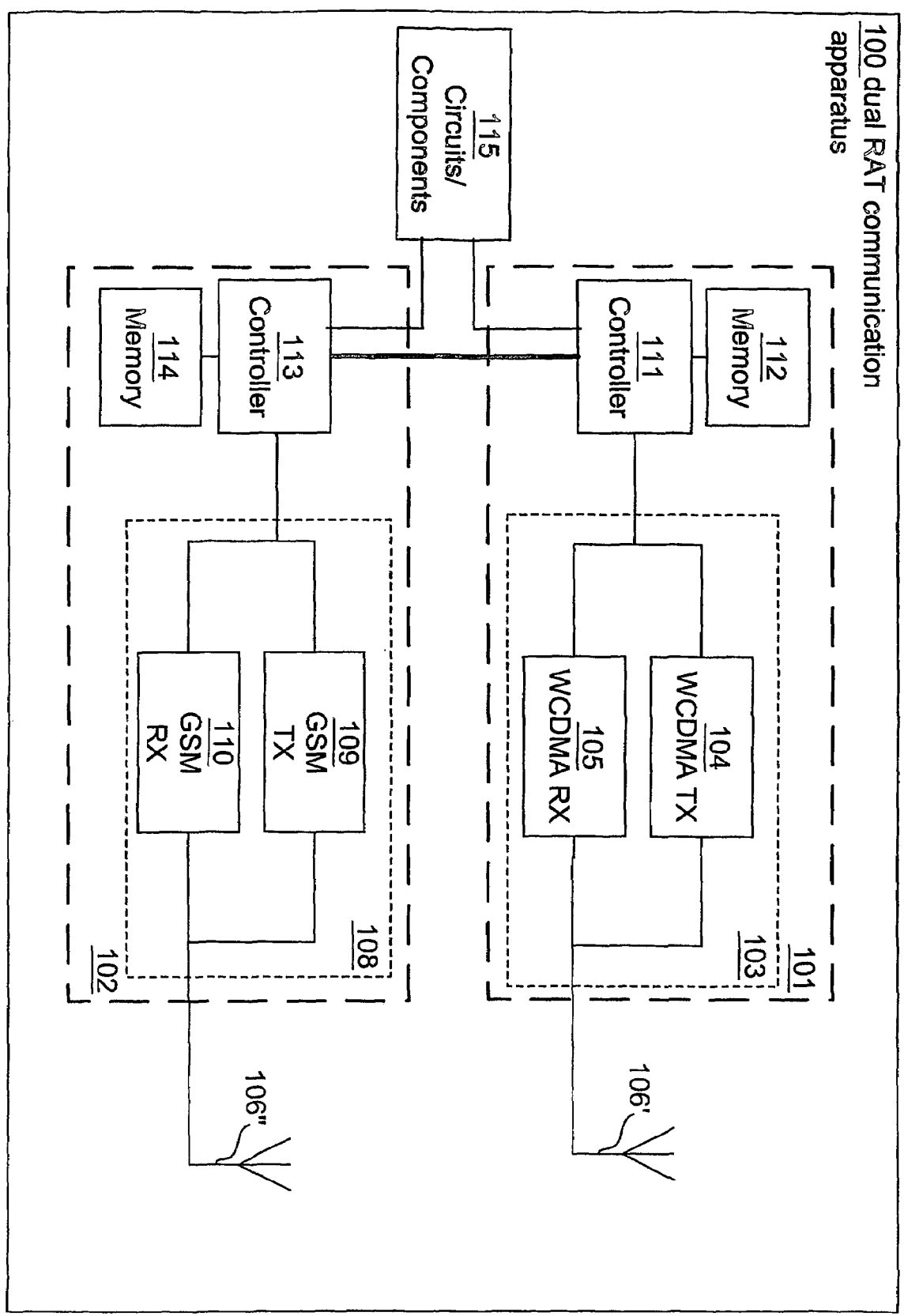
FIG. 1C is a schematic block diagram of a second embodiment of a dual-radio access technology terminal according to the invention.

In still another embodiment of the dual radio access technology communication apparatus 100, the first and second radio access technology devices 101, 102 are connected to separate antennas 106' and 106", as shown in FIG. 1C.

Other alternative embodiments provide measurement event synchronisation according to the invention in some cases between CDMA2000 and WCDMA or GSM within the scope of the invention.

The invention claimed is:

1. A method for synchronizing measurement events within a portable radio communication apparatus providing multiple radio access technologies including a first radio access technology device and a second radio access technology device, comprising the steps of:
   the portable radio communication apparatus engaging in transceiver activities that are separated by one or more idle gaps;
   the portable radio communication apparatus ascertaining whether an idle gap between transceiver activities of the first radio access technology device is suitable for usage by the second radio access technology device;
   the first radio access technology device responding to the idle gap between transceiver activities of the first radio access technology device being suitable for usage by the second radio access technology device by sending an execute signal to the second radio access technology device for initiating inter radio access technology measurements of said second radio access technology device to be performed during said idle gap;
   the second radio access technology device responding to the execute signal by performing a measurement operation during the idle gap; and
   preparing said second radio access technology device for performing said inter radio access technology measurements,
   wherein said step of preparing said second radio access technology device comprises the step of:
   determining whether inter radio access technology measurements are possible during a next gap, based on information about an estimated length of said gap.

2. A method according to claim 1, wherein said execute signal is sent at the beginning of said gap.

3. A method according to claim 1, wherein said execute signal is sent at a specified period before said gap.

4. A method according to claim 1, comprising, before the step of sending an execute signal, the additional step of:
   sending a prepare signal to said second radio access technology device for information about an upcoming gap available for inter radio access technology measurements of said second radio access technology device.

5. A method according to claim 1, wherein said step of preparing said second radio access technology device comprises the step of: bringing said second radio access technology device out of a low-power consuming state.

6. A method according to claim 4, wherein said prepare signal includes information about the estimated length of said gap.

7. A method according to claim 1, wherein said execute signal includes information about the estimated length of said gap.

8. A method according to claim 1, wherein the step of identifying an idle gap is performed between transceiver activities of a GSM based first radio access technology device and said execute signal is sent to a WCDMA based second radio access technology device for initiating inter radio access technology measurements of said WCDMA based second radio access technology device to be performed during said gap.

9. A method according to claim 1, wherein the step of identifying an idle gap is performed between transceiver activities of a WCDMA based first radio access technology device and said execute signal is sent to a GSM based second radio access technology device for initiating inter radio access technology measurements of said GSM based second radio access technology device to be performed during said gap.

10. A portable radio communication apparatus providing multiple radio access technologies, comprising a controller, a first radio access technology device and a second radio access technology device, wherein the first radio access technology device engages in transceiver activities that are separated by one or more idle gaps, wherein said first and second radio access technology devices are operatively interconnected, and said controller comprises:

means for ascertaining whether an idle gap between transceiver activities of said first radio access technology device is suitable for usage by the second radio access technology device;

means for responding to the idle gap between transceiver activities of the first radio access technology device being suitable for usage by the second radio access technology device by causing the first radio access technology device to send an execute signal to said second radio access technology device for initiating inter radio access technology measurements of said second radio access technology device during said idle gap;

means for causing the second radio access technology device to respond to the execute signal by performing a measurement operation during the idle gap; and means for preparing said second radio access technology device for performing said inter radio access technology measurements, wherein said means for preparing said second radio access technology device comprises:

means for determining whether inter radio access technology measurements are possible during a next gap, based on information about an estimated length of said gap.

11. A portable radio communication apparatus according to claim 10, wherein said first and second radio access technology devices have common radio resource means for said inter radio access technology measurements.

12. A portable radio communication apparatus according to claim 10, wherein said first radio access technology device is a GSM based radio access technology device and said second radio access technology device is a WCDMA radio access technology device.

13. A portable radio communication apparatus according to claim 10, wherein said first radio access technology device is a WCDMA based radio access technology device and said second radio access technology device is a GSM radio access technology device.

\* \* \* \* \*